United States Patent [19]

Carey et al.

[11] Patent Number: 5,112,413
[45] Date of Patent: May 12, 1992

[54] METHOD FOR TREATING METAL SURFACES WITH A POLYMER SOLUTION

[75] Inventors: William S. Carey, Ridley Park; Fu Chen, Newtown; David W. Reichgott, Richboro, all of Pa.

[73] Assignee: Betz Laboratories, Inc., Trevose, Pa.

[21] Appl. No.: 543,642

[22] Filed: Jun. 26, 1990

[51] Int. Cl.$^5$ .............................. C23C 22/05
[52] U.S. Cl. ..................... 148/251; 427/388.2; 427/388.4; 427/409; 106/14.11; 524/543; 524/547; 524/551; 524/555
[58] Field of Search ............ 148/241, 243, 251, 257; 524/543, 547, 551, 555; 427/388.2, 409, 388.4; 252/392, 393, 388, 389.23; 106/14.11, 14.21, 14.12, 14.15

[56] References Cited

U.S. PATENT DOCUMENTS

| | | | |
|---|---|---|---|
| 3,493,440 | 2/1970 | Ashdown | 148/6.15 |
| 3,695,942 | 10/1972 | Binns | 148/6.15 |
| 4,039,353 | 8/1977 | Kulick et al. | 148/6.15 |
| 4,110,129 | 8/1978 | Matsushima et al. | 148/6.15 |
| 4,220,485 | 9/1980 | Howell et al. | 148/6.15 |
| 4,360,000 | 3/1983 | Lindert | 148/6.15 |
| 4,433,015 | 2/1984 | Lindert | 148/6.15 |
| 4,517,028 | 5/1985 | Lindert | 148/6.14 |

Primary Examiner—Jay H. Woo
Assistant Examiner—Jeremiah F. Durkin, II
Attorney, Agent, or Firm—Alexander D. Ricci; Bruce E. Peacock

[57] ABSTRACT

Methods for treating metal surfaces including contacting the surface with a water soluble or water dispersible polymer comprising a repeat unit (a) having the structure

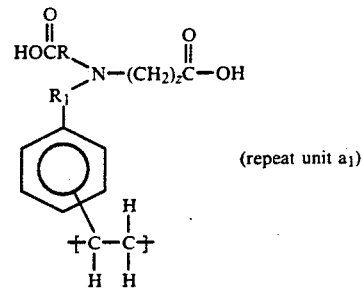

(I)

(repeat unit a₁)

or salt form of said repeat unit, wherein R and $R_1$ are the same or different and are independently chosen from $C_1$-$C_3$ lower alkylene and wherein z is an integer of from 1-3. The methods also include use of copolymers having in addition to repeat unit (a) above, a repeat unit (b) having the structure

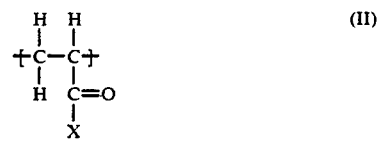

(II)

from wherein X is OH, $NH_2$, or OM wherein M is a cation, the molar ration of $(a_1)$:(b) being present in said copolymer being from about 20:1 to 1:20. The methods provide chromium free rinse solutions for use in rinsing phosphate-based conversion coated metal surfaces.

17 Claims, No Drawings

METHOD FOR TREATING METAL SURFACES WITH A POLYMER SOLUTION

FIELD OF THE INVENTION

The present invention pertains to novel N,N-substituted glycine homopolymers and copolymers and to methods of using same in chromium-free rinse solutions for rinsing phosphate-based conversion coated metal surfaces.

BACKGROUND OF THE INVENTION

Protective metal coatings are commonly applied to metal surfaces to improve corrosion resistance and paint adherence characteristics. These protective metal coatings are referred to as conversion coatings and consist of a variety of protective treatments including iron phosphate, manganese phosphate, zinc phosphate, zinc phosphate modified with calcium, nickel, or magnesium ions, mixed metal oxides and titanium or zirconium organometallic coatings. These protective treatments may be applied to a multiplicity of different metals such as zinc, iron, aluminum, and cold-rolled, ground, pickled, and hot-rolled steel and galvanized steel surfaces. As used herein, "metal surface" shall include both untreated metal surfaces and those to which a conversion coating has been applied.

Normally, after a conversion coating has been applied to the requisite metal surface, the surface is subjected to a final rinsing step to enhance the corrosion resistance and to prepare the surface for the reception of a final finish coating, such as a paint, enamel or Japan varnish.

Traditionally, hexavalent and trivalent chromium rinse solutions have been used for this post-conversion coating rinse process. Unfortunately, such chromium compounds have fallen into disfavor due to their inherent toxicity problems and the ensuing problem of waste disposal due to the presence of hexavalent and/or trivalent chromium in process effluents.

Another problem that needs to be mentioned, in conjunction with such chromium-based post-conversion coating rinses, is that certain paint types, when applied to chromium-treated metal surfaces, tend to chip, peel, and/or blister. Additionally, certain surfaces with non-planar contours tend to accumulate residues of chromium salts thus exacerbating the aforementioned peeling and blistering problems.

In an attempt to move away from the chromium-based rinse systems, amine, tannin, titanium, zinc, zirconium, and aminoalkylated polyvinylalcohol rinses have been attempted. However, these chromium-free post-conversion coating rinse programs have not earned wide acceptance, principally due to disappointing performance in retarding corrosion.

SUMMARY OF THE INVENTION

We have surprisingly found that certain N,N-disubstituted glycine homopolymers and copolymers provide effective post-treatment (i.e., post-conversion coating treatment) rinses that improve paint adherence characteristics and offer toxicological benefits when compared to the chromium-containing post-rinses.

Specifically, we have found that N,N-substituted glycine polymers having repeat units of the structure

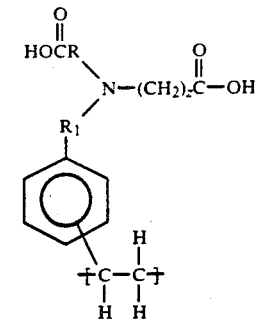

and salt forms thereof are effective post-treatment rinses for conversion-coated metal surfaces. In the formula (I) supra., R and $R_1$ may be the same or different and are chosen from $C_1$–$C_3$ lower alkyl. z is an integer from 1–3. Mixtures, including the meta and para ethenyl substituted phenyl moiety isomers, may be present.

Additionally, copolymers having repeat units as per (I) above and other repeat units (II) based on monomeric acrylic acid or salts thereof or acrylamide monomers are useful. Repeat unit (II) has the structure:

wherein $x = NH_2$, OM, or OH wherein M is a cation.

The homopolymers and/or copolymers may be provided as post-conversion coat rinses in an amount of from about 9.25–10 grams polymer per liter of aqueous post-treatment rinse solution. Preferably, the homopolymers and copolymers are characterized by having a Brookfield viscosity of about 10.0–35 cps at 25% solids measured at 25° C. The molecular weight of the homopolymers and copolymers is not critical as long as the resulting polymers are either water soluble or water dispersible.

PRIOR ART

U.S. Pat. No. 3,695,492 (Binns) teaches the use of post-treatment rinse solutions consisting of water-soluble zirconium containing compounds such as ammonium zirconyl carbonate.

Aminoalkylated polyvinylphenol derivatives are disclosed in U.S. Pat. Nos. 4,517,028 (Lindert) and 4,433,015 (Lindert). Similarly, poly-4-vinylphenols or the reaction products of an aldehyde or ketone and poly-4-vinylphenol are disclosed for use in post-treating conversion-coated metals in U.S. Pat. No. 4,376,000 (Lindert).

In U.S. Pat. No. 4,220,485, a combined post-treatment rinse of, for instance, water, zinc oxide, sodium molybdate, phosphoric acid, and amino tri(methylenephosphonic acid) is disclosed for use in processes for sealing phosphatized metal components to improve corrosion resistance and paint adhesion.

Conversion-coated zinc or zinc alloy surfaces are post-treated with an aqueous solution comprising titanium and an adjuvant selected from phosphoric acid, phytic acid, tannin, the salts and esters of the acids and, additionally, hydrogen peroxide as per U.S. Pat. No. 4,110,129 (Matsushima et al).

Conversion-coating post-treatments comprising melamine-formaldehyde resins and vegetable tannins are taught in U.S. Pat. No. 4,039,353 (Kulick). Formulations comprising primary phosphates selected from primary phosphate of ammonia, amines, and mixtures thereof are taught in U.S. Pat. No. 3,493,440 (Ashdown) with ammonium dihydrogen phosphate and triethanolamine dihydrogen phosphate being the most preferred post-treatment rinses. As can be seen from the above, none of the above-noted prior art discloses or suggests the use of the N,N-substituted glycine homopolymers and copolymers of the present invention.

DETAILED DESCRIPTION OF THE PREFERRED EMBODIMENT

We have found that N,N-substituted glycine polymers having repeat units shown in Formula I, demonstrate improved anticorrosive and adhesive properties when compared to the tested prior art post-treatment rinse compounds. Specifically, these N,N-substituted glycine polymers are characterized by having repeat units ($a_1$) of the structure

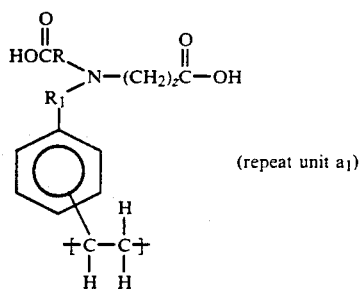

(repeat unit $a_1$)

wherein $R_1$ and R are the same or different and are chosen from $C_1$-$C_3$ lower alkylene. z is an integer of from 1 to 3, preferably 1. The polymers also include salts of the above repeat units and are either water-soluble or water-dispersible. The ethenyl group on the phenyl substituent may be located on either the ortho, meta, and/or para locations, but is most preferably located meta or para to the $R_1$ substituent. Preferably, mixtures of about 70% meta and 30% para are used accounting for repeat units of the formulae:

repeat unit ($a_2$)(70%)

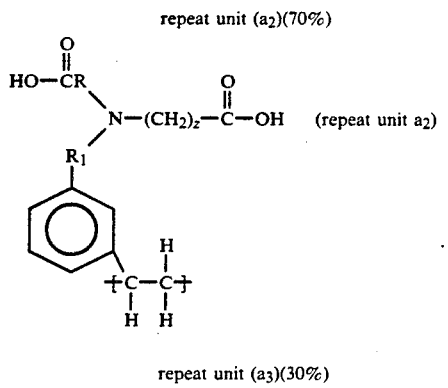

repeat unit ($a_3$)(30%)

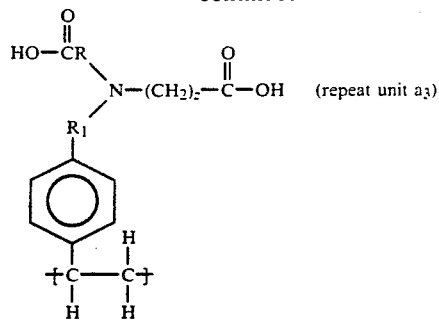

The molecular weight of the polymers is not critical as long as the resulting polymer is either water-soluble or water-dispersible. Similarly, viscosity is not critical as long as either water-solubility or dispersibility are met, but preferably is within the range of about 10–35 cps Brookfield as measured at 25% solids at 25° C.

In the above Formulae I ($a_1$, $a_2$ and $a_3$), both R and $R_1$ are preferably methylene and z is preferably 1.

The N,N-substituted glycine monomers, necessary for polymer preparation, are prepared in similar manner to the procedures reported by L. R. Morris et al, J. Amer. Chem. Soc., 81, pp. 377–382, 1959. The starting material, vinylbenzylchloride (VBC) is commercially available from a plurality of sources, including Dow Chemical. Commercially available VBC includes both meta ($\approx$70%) and para ($\approx$30%) isomers.

It should be noted that the desired monomer derivatives of VBC will also show such isomerism. In accordance with the Morris synthesis, monomers useful for polymer formation may be prepared in accordance with the general method

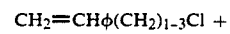

$CH_2$=$CH\phi(CH_2)_{1-3}Cl$ +

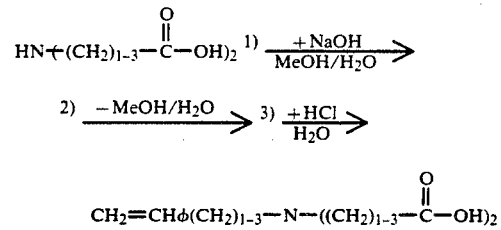

Specifically, in order to prepare the preferred monomer, the following route, in accordance with Morris, supra., is followed.

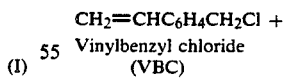

$CH_2$=$CHC_6H_4CH_2Cl$ +
Vinylbenzyl chloride
(VBC)

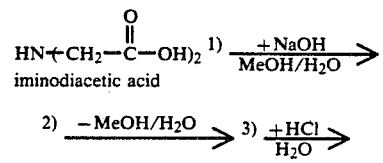

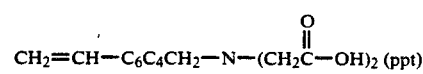

Glycine, N-(carboxymethyl)-N-[(3-(and 4-)ethenyl phenyl)methyl]

Once the desired monomer has been obtained, free radical chain addition polymerization may proceed in aqueous solution using conventional peroxide, persulfate, etc., initiators. The resulting polymers may be isolated by well-known methods such as precipitation, etc., or they may be used in the aqueous solution.

Additionally, in order to provide for an economically attractive effective post-treatment, copolymers having the repeat units $a_1-a_3$ (Formulae I) may be copolymerized with acrylic acid or acrylamide monomers (Formula II) in accordance with the above aqueous solution techniques, resulting in a copolymer of the structure

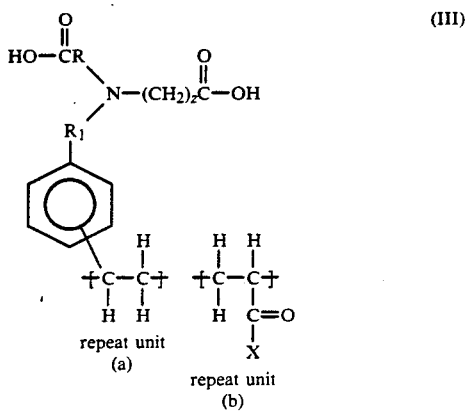

wherein R, $R_1$ and z are as given in Formulae I and wherein $X=NH_2$, OM, or OH, wherein M is a cation. The molar ratio of (I):(II) is from about 20:1 to 1:20. Again, the molecular weight of the copolymers is not critical as long as the copolymer is water soluble or water dispersible.

The thus formed N,N-substituted glycine or derivative homopolymers and/or copolymers are then employed to rinse the requisite metal surface, preferably after a conversion coating as specified supra. has been imparted thereto. The thus conversion coated metal surface is either immersed, sprayed, brushed, or roller coated with an aqueous solution containing the above homo or copolymers. The polymer is present in an amount of about 0.25-10 grams polymer per liter of aqueous rinse solution. The rinse is preferably carried out at a pH maintained within the range of about 3 to 8.5 to enhance desired corrosion inhibition and paint adhesive properties without adversely affecting the previously applied conversion coat.

The time of treatment of the metal surface with the rinse solution need only be long enough to ensure complete wetting of the metal surface. Rinse time can therefore be from about 5 seconds to 5 minutes.

The rinse solution can be operated at temperatures as high as about 200° F. Subsequent to the rinse step, the metal is dried such as via travel through an oven or by allowing drying at ambient.

Preliminary results, as per the following examples, indicate that the N,N-substituted glycine homopolymers and copolymers perform unexpectedly well when applied over zinc phosphate conversion coatings. However, the invention, in its broadest aspects, is applicable to any metal surface whatsoever whether it is provided over a conversion coating or not.

EXAMPLES

The invention will now be further described with reference to a number of specific examples which are to be regarded solely as illustrative, and not as restricting the scope of the invention.

Example 1

Preparation of Glycine, N-(carboxy-methyl)-N-[(3-(and 4-)ethenylphenyl)methyl]

Vinylbenzene chloride (VBC Dow Chemicals) comprising a mixture of the meta ($\approx 70\%$) and para ($\approx 30\%$) isomers was used as a starting material.

To a 2,000 ml reactor was charged 497.36 g of D.I. water, 474.8 g methanol, 52.84 g 50% aqueous sodium hydroxide, and 54.32 g iminodiacetic acid. The reactor contents were heated to a slight reflux, then VBC was added dropwise over a one hour period. After one-quarter of the VBC was added, 150.2 g 17.59% aqueous sodium hydroxide was charged into the reactor. After the VBC addition, the batch was held at a slight reflux for thirty minutes, then solvent was removed under vacuum until one-third the original volume remained. The aqueous solution was then extracted with chloroform (3×20 ml), and additional solvent was then removed under vacuum until three-fourths the volume remained. Acidification of the aqueous solution with 96.74 g 37% aqueous HCl resulted in a white solid which was filtered, diluted to 10% aqueous solution, refiltered, and dried in vacuo to yield a light tan colored powder. The structure of the produced monomer was verified by Carbon 13 NMR.

Example 2

Preparation of Poly[glycine, N-(carboxymethyl)-N-[(3-(and 4-)ethenylphenyl)methyl]

To a 250 ml reactor was charged 27.34 g D.I. water and 1.34 g of V-50 initiator (available Wako Chemical). The solution was purged with nitrogen and heated to and maintained at 70° C. A solution of 37.8 g D.I. water, 7.87 g 50% aqueous sodium hydroxide and 25.0 g monomer (example 1) was then charged over a two-hundred minute period. The rate of addition was decreased by 50% at both the fifty and the one-hundred minute marks of the addition period. After addition, the batch was held at 70°±2° C. for one hour; then at 90°±2° C. for another hour. The batch was then cooled to room temperature, and 6.27 g 50% aqueous sodium hydroxide was added.

The structure of the resulting homopolymer was verified by Carbon 13 NMR. The polymer solution had a Brookfield viscosity of 29.6 cps at 25% solids as measured at 25° C.

Example 3

Preparation of copoly[acrylamide/glycine, N-(carboxymethyl)-N-[(3-(and 4-)ethenylphenyl methyl]—Molar ratio 1:1 acrylamide:glycine monomer 101.84 g D.I. water and 2.75 g of V-50 initiator were charged to a 500 ml reactor. The solution was purged with nitrogen and heated to and maintained at 70° C. A solution of 33.44 g D.I. water, 8.05 g 50% aqueous sodium hydroxide, and 25.59 g (0.1 mole) monomer (example 1) was then charged simultaneously into the reactor along with 14.3 g 50% aqueous solution acrylamide (0.1 mole) over a period of one hundred and fifty seconds. The addition rate was decreased by 50% fifty minutes into the addition. After addition, the batch was held at 70°±2° C. for the first hour; then at 80°±2° C. for the second hour.

The structure of the resulting copolymer was verified by Carbon 13 NMR. The copolymer solution had a Brookfield viscosity of 13.4 cps at 17.7% solids and 25° C.

EFFICACY

In order to demonstrate the efficacy of the N,N-substituted glycine homopolymers and copolymers in providing a hexavalent chromium-free post-conversion coating rinse, the following candidate solutions were prepared.

Rinse Solution One
0.1 g/l (solids) homopolymer of Example 1 adjusted to pH ≈6.0 with $H_3PO_4$ Rinse Solution Two
1.0 g/l (solids) homopolymer of Example 1 adjusted to pH ≈3.4–3.6

Comparative Rinse Solution One
2.67 g/l of an aqueous concentrate (18.7% solids) of poly[4-vinyl phenol] (Resin-M, Maruzen Petrochemical Company) aminoethylated with formaldehyde and N-methylaminoethanol according to the disclosure of Example 1—U.S. Pat. No. 4,433,015. The sample was concentrated in vacuo to remove residual volatile organics prior to use. The general structure is an aminoalkylated polyvinyl phenol as follows:

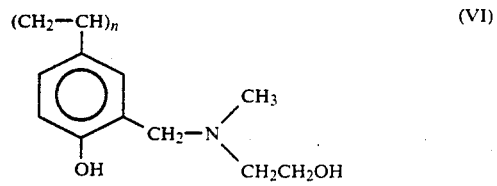
(VI)

Example 4

Efficacy

Cold-rolled steel test panels were cleaned in a commercial spray cleaner solution and rinsed in tap water. A commercial titanated phosphate activator solution was then applied to the panels by immersing same in the activator solution for 20 seconds. A zinc phosphate conversion coating was then applied by treating the cleaned and activated test panels for 1 minute by spraying the panels with a concentrated zinc phosphate solution. A 2.5% V/V zinc phosphate solution was formed in 130° F. tap water, producing about 16 g/l $PO_4$, 3 g/l Zn, 0.2 g/l Ni, and 0.5 g/l $NO_3$. The pH of the concentrated zinc phosphate solution was adjusted to 3.4 to 3.6 and sodium nitrite was added to give a concentration of about 0.18 g/l as $NO_2$.

After the conversion coating was formed, the test panels were rinsed in tap water and the candidate rinse solutions as per the above formulations were applied via immersion of the test panels for about seven seconds at about 110° F. (unless otherwise noted). The test panels were dried without rinsing in a stream of warm air. When dried, the test panels were stored in a desiccator, and then later painted with a bake-on enamel (PPG White Polycon II).

The test panels were then scribed and exposed to a spray mist of 5% NaCl in a method known as "neutral salt fog testing" for a period of 144 hours. The panels were then rated in accordance with ASTM D-1654 (Procedure A, method 2) with a value of 10 signifying no paint loss and a value of 0 signifying near total paint loss.

The following data were obtained in a series of tests utilizing the post-treatment solutions listed, supra.

|  | Treatment Solution | ASTM RATING(S) |
| --- | --- | --- |
| Series One | Comparative Rinse Sol. #1 | 4.5 |
|  | Rinse Sol. #1 | 5 |
|  | Rinse Sol. #2 | 6 |
| Series Two | Comparative Rinse Sol. #1 | 6, 6 |
|  | Rinse Sol #2 | 7, 6 |

In accordance with these tests, it can be seen that the rinse solutions in accordance with the invention are superior to the comparative test solution #1 taught by prior art U.S. Pat. No. 4,433,015 in providing a non-chromate post rinse for metal surfaces provided with a phosphate conversion coating.

Example 5

Efficacy of Copolymer of Example 3

Conditions for the application of the copolymer of Example 3 to the test panels were similar to those detailed above for Example 4 except that the post-conversion coating treatment solutions were applied at ambient temperature. In addition to salt fog testing results, impact testing results in accordance with well-known procedures, were reported. The impact testing results given in terms of in-lb designate momenta for which there was no cracking nor disadhesion of the paint from the metal substrate.

| Test Solution | Dose | pH | Salt-Fog Ratings(s) | Direct Impact (in-lb passed) |
| --- | --- | --- | --- | --- |
| Example 2 homopolymer | 100 | 6.0 | 6, 5 | 160 |
| Example 3 copolymer | 100 | 6.0 | 8 | 160, 120 |
| Example 2 homopolymer | 100 | 3.0 | 7 | 140, 140 |
| Example 3 copolymer | 100 | 3.0 | 4, 5 | 160 |

In accordance with the example, the Example 3 copolymer was found to be nearly equivalent to the homopolymer of Example 2. However, the copolymer is much more attractive from the economic point of view due to the fact that less of the glycine monomer is needed.

Example Six

A series of tests were conducted using the general procedures reported in conjunction with Example 5 to contrast performance of the conventional chelant, ethylenediaminetetraacetic acid (EDTA) and the homopolymer specified in Example 2. These tests illustrate the surprising results attendant upon use of the polymeric bound chelant (Example 2 polymer) versus those resulting from use of the non-polymeric bound chelant EDTA.

| Conversion Coated; Post-Rinse Candidate | Dosage | pH | Rating(s) |
| --- | --- | --- | --- |
| EDTA | 1000 | 3.0 | 0, 0 |
| EDTA | 100 | 3.7 | 5, 5 |

| Conversion Coated; Post-Rinse Candidate | Dosage | pH | Rating(s) |
|---|---|---|---|
| Example 2 homopolymer | 100 | 3.0 | 7, 7 |

While this invention has been described with respect to particular embodiments thereof, it is apparent that numerous other forms and modifications of this invention will be obvious to those skilled in the art. The appended claims and this invention generally should be construed to cover all such obvious forms and modifications that are within the true spirit and scope of the present invention.

We claim:

1. A method for treating a metal surface comprising contacting said surface with a water soluble or water dispersible polymer comprising a repeat unit ($a_1$) having the structure:

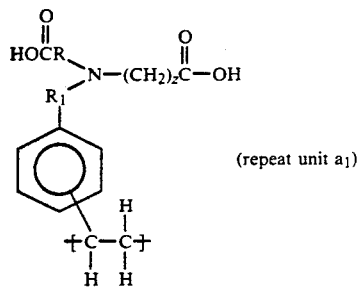

(repeat unit $a_1$)

or salt form of said repeat unit, wherein R and $R_1$ are the same or different and are independently chosen from $C_1$-$C_3$ lower alkylene and wherein z is an integer of from 1-3.

2. A method as recited in claim 1 wherein said repeat unit ($a_1$) comprises a repeat unit ($a_2$) having the structure

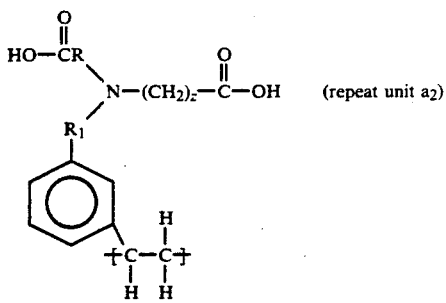

(repeat unit $a_2$)

3. A method as recited in claim 1 wherein said repeat unit ($a_1$) comprises repeat units ($a_3$) having the structure

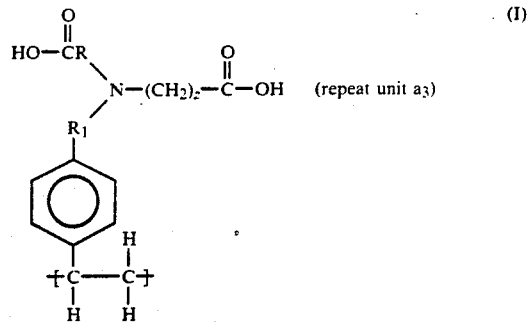

(repeat unit $a_3$)

4. A method as recited in claim 1 wherein said contacting comprises rinsing said metal surface in an aqueous bath having a pH of about 3 to 8.5.

5. A method as recited in claim 4 further comprising adding from about 0.25-10 grams of said polymer per liter of said aqueous bath.

6. A method as recited in claim 1 wherein both R and $R_1$ are methylene and z is 1.

7. A method as recited in claim 6 wherein said polymer comprises a Brookfield viscosity of about 10.0 cps-35 cps at 25.0% solids at 25° C.

8. A method as recited in claim 1 wherein said polymer comprises a copolymer and wherein in addition to said repeat unit ($a_1$), a repeat unit (b) is present in said copolymer, said repeat unit (b) having the structure

wherein X is OH, $NH_2$, or OM wherein M is a cation, the molar ratio of ($a_1$):(b) being present in said copolymer being from about 20:1 to 1:20.

9. A method as recited in claim 8 wherein X is $NH_2$.

10. A method as recited in claim 8 wherein said copolymer comprises a Brookfield viscosity of about 10.0 cps-35 cps at 25.0% solids at 25° C.

11. A method as recited in claim 8 wherein said contacting comprises rinsing said surface in an aqueous bath containing said copolymer, said bath having a pH of about 3 to 8.5.

12. A method as recited in claim 11 further comprising adding from about 0.25-10 grams of said copolymer per liter of said aqueous bath.

13. A method as recited in claim 8 wherein $R_1$ and $R_2$ are both methylene and wherein z is 1.

14. A method as recited in claim 1 or claim 8 wherein prior to said contacting said metal surface has been coated with a conversion coating.

15. A method as recited in claim 14 wherein said conversion coating comprises a phosphate conversion coating.

16. A method as recited in claim 15 wherein said phosphate conversion coating comprises zinc phosphate.

17. A method as recited in claim 4 wherein said rinsing is chromate-free.

* * * * *